Dec. 11, 1951   D. MacD. PATERSON   2,578,262
PHOTOGRAPHIC SPOOL
Filed Dec. 5, 1949   4 Sheets-Sheet 1

Inventor
Donald MacDougal Paterson
By
Stevens Davis Miller & Mosher
his Attorneys Dec. 11, 1951   D. MacD. PATERSON   2,578,262
PHOTOGRAPHIC SPOOL
Filed Dec. 5, 1949   4 Sheets-Sheet 2

Dec. 11, 1951     D. MacD. PATERSON     2,578,262
PHOTOGRAPHIC SPOOL
Filed Dec. 5, 1949     4 Sheets-Sheet 3
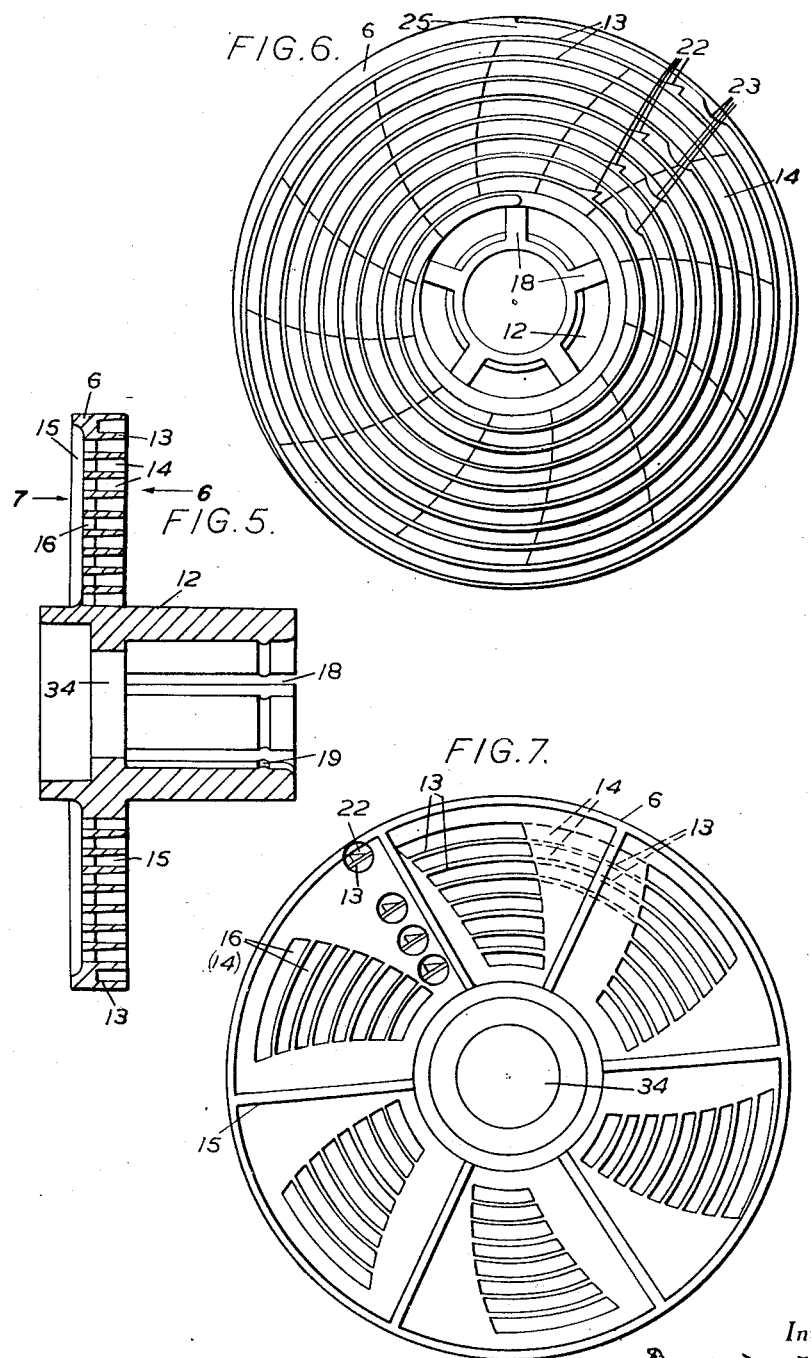
Inventor
Donald MacDougal Paterson
By
Stevens, Davis, Miller & Mosher
his Attorneys Dec. 11, 1951  D. MacD. PATERSON  2,578,262
PHOTOGRAPHIC SPOOL
Filed Dec. 5, 1949  4 Sheets-Sheet 4
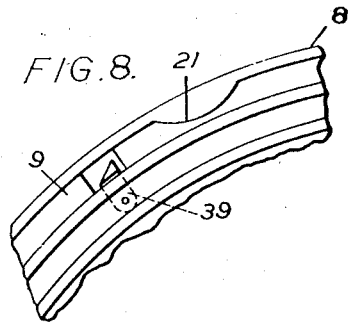
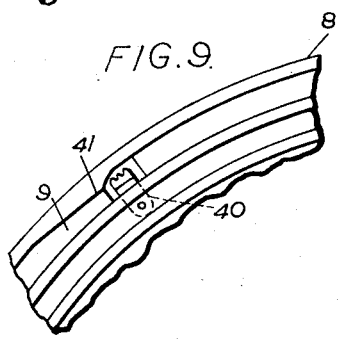
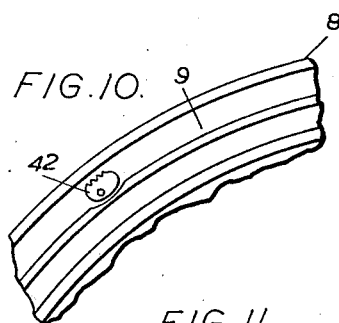
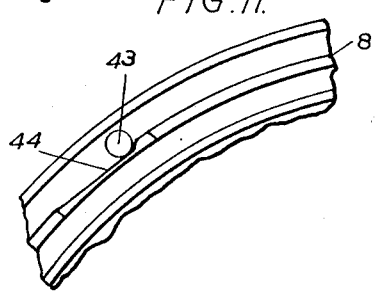
Inventor
Donald MacDougal Paterson
By
Stevens, Davis, Miller & Mosher
his Attorneys Patented Dec. 11, 1951

2,578,262

UNITED STATES PATENT OFFICE 2,578,262

PHOTOGRAPHIC SPOOL

Donald MacDougal Paterson, Temple,
London, England

Application December 5, 1949, Serial No. 131,155
In Great Britain December 15, 1948

9 Claims. (Cl. 242—77)

This invention relates to spools for receiving a photographic film for treatment in a processing tank, said spools being of the kind comprising a pair of spaced coaxial plates each having a spiral groove on its inner face, each of said grooves being open at one end.

In the known constructions of such spools the plates were fixed relatively to one another and the film was inserted into the spool by introducing the side edges of the film at its leading end into the open entry ends of the grooves and advancing the film by pushing it manually along the grooves until the whole of the film had become wound into the spool.

This method of loading the spool presents considerable difficulty owing to friction which resists the introduction of the film, and unless the greatest care is exercised the film is liable to become jammed and the surface of the film is liable to be damaged by finger marks or scratches.

The object of the present invention is to provide means for overcoming the frictional resistance without damage to the film and for feeding the film into the spiral grooves without the necessity for pushing the film manually after the initial introduction thereof into the spiral grooves.

According to the present invention a spool adapted to hold a length of photographic film in spaced spiral form, e. g. for treatment in a processing tank, comprises a first plate having a clockwise spiral groove on one face thereof, a second plate having a similar but anticlockwise spiral groove on one face thereof, means for holding the said plates in coaxial spaced relationship with the spirally-grooved faces directed inwards and together defining a single spiral path, said means permitting relative rotation of the said plates, and unidirectional film-gripping means located in at least one of the said grooves.

The spiral path defined by the oppositely disposed grooves may have either its inner end or outer end open for the insertion of the leading end of a film, and one or both of the spiral grooves may be provided with unidirectional film gripping means.

The term "unidirectional film gripping means" when used in my description and claims is to be taken as specifying any means which permit movement of the film in the direction in which it is intended to travel and resist movement of the film in the opposite direction. Such means may include teeth as described hereafter or may include such devices as pawls to engage the film in one direction and release it in the opposite direction, wedges roughened or serrated to grip the film in the spiral, or rollers working on inclined planes incorporated in the spiral grooved plates.

The unidirectional film gripping means is conveniently constituted by a projection extending across the path of the film from one wall of the groove, and preferably the or each projection is in the form of a ratchet tooth having a radial face and an inclined face, and is disposed with its inclined face directed towards the entry end of the groove.

According to a further feature of the invention, in order to increase the gripping action, a projection or hump is provided on the opposite side wall of the groove, said hump extending across the film path and being disposed adjacent to the projection or tooth on the side thereof away from the entry end of the groove.

In order that the invention may be more completely understood and readily carried into practice, one embodiment according thereto will now be described with reference to the accompanying drawings in which.

Figure 1:
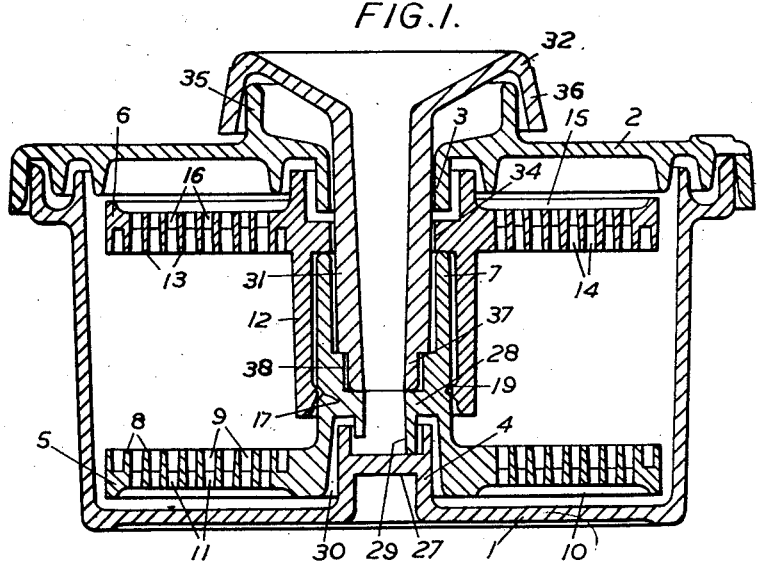
Figure 1 shows a cross section of the spool mounted in a processing tank.
Figure 2:
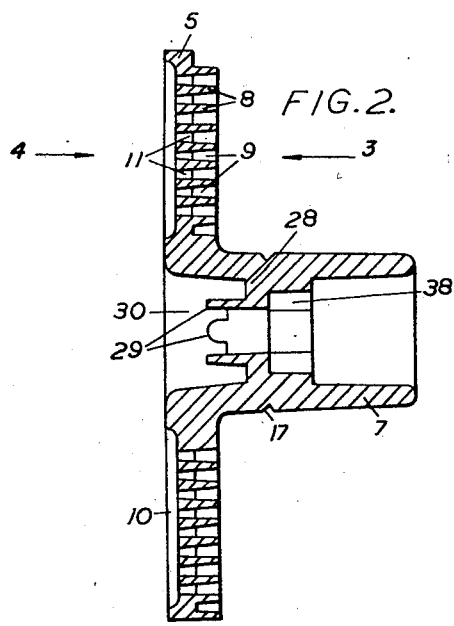
Figure 2 shows a section of one of the spirally grooved plates.
Figure 3:
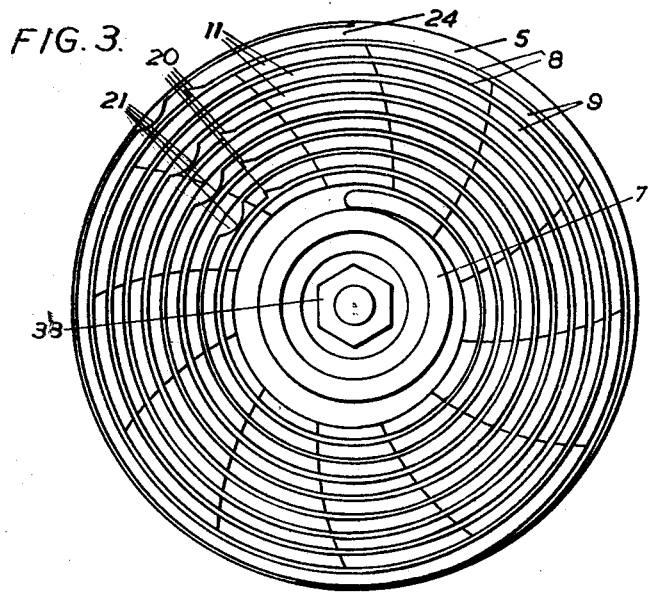
Figure 4:
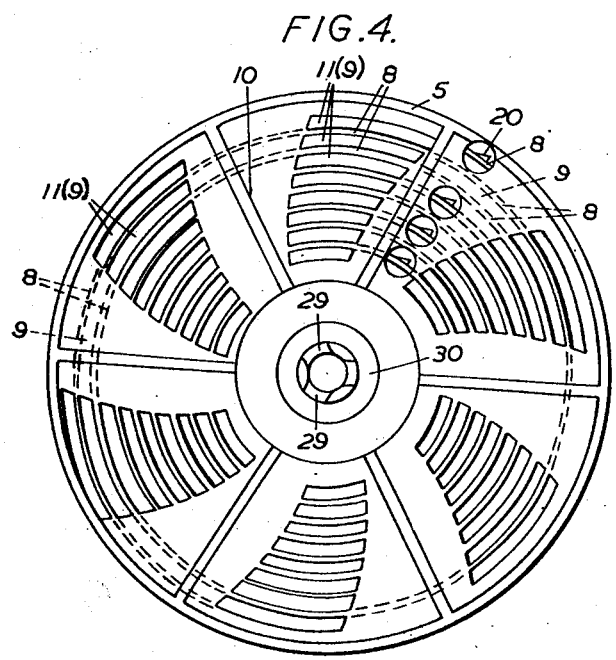

Figure 3 is an elevation of the plate shown in Figure 2 looking in the direction of the arrow 3, Figure 4 is an elevation of the plate shown in Figure 2 looking in the direction of the arrow 4, Figure 5 shows a section of the other plate, Figure 6 is an elevation of the plate shown in Figure 5 looking in the direction of the arrow 6, and Figure 7 is an elevation of the plate shown in Figure 5 looking in the direction of the arrow 7.

Figures 8, 9, 10 and 11 illustrate details of variations in the film gripping means.

Referring now to the drawings:

The device comprises a tank 1 having a lid 2 provided with an inwardly directed hollow boss 3 coaxial with an inwardly directed hollow boss 4 on the bottom of the tank, the bosses 3 and 4 acting as bearings for the spool in the manner hereinafter described.

The spool comprises two plates 5 and 6 formed with respective spiral grooves and removably connected together for relative rotation in the manner described below.

The plate 5 is formed with an integral sleeve 7 and on the face of the plate from which this sleeve projects there is formed a continuous spiral rib 8 the convolutions of which define between them a spiral groove 9. The plate is also formed with radial ribs or spokes 10 (Figures 2 and 4) and in the sectors between adjacent spokes 10 the material of the plate is omitted to leave a series of open slots 11 between adjacent convolutions of the spiral rib 8.

The plate 6 is also formed with an integral sleeve 12 and on the face of the plate from which this sleeve projects there is formed a continuous spiral rib 13 the convolutions of which define between them a spiral groove 14. The plate 6 is further formed with radial ribs or spokes 15 (Figures 5 and 7) and in the sectors between adjacent spokes 15 the material of the plate is omitted to leave a series of open slots 16 between adjacent convolutions to the spiral rib 13.

The purpose of the slots 11 and 16 is to permit the flow of treating liquid through the plates when the spool is assembled and mounted in the tank with a film held therein.

The sleeve 7 of the plate 5 is formed with an external circumferential groove 17 and the sleeve 12 of the plate 6 is slotted longitudinally at 18 and is provided with an internal circumferential rib 19.

In assembling the spool the sleeve 12 of the plate 6 is pushed over the sleeve 7 of the plate 5. The internal diameter at the apex of the rib 19 is slightly less than the external diameter of the sleeve 7 and as the sleeve 12 is pushed over sleeve 7, the sleeve 12 expands, this expansion being permitted by the resilience imparted to the sleeve 12 by the provision of the slots 18. When the rib 19 comes into register with the groove 17 the sleeve 12 is enabled to contract to its normal diameter, the rib 19 snapping into the groove 17 and preventing axial separation of the sleeves and their plates while permitting relative rotation thereof.

Formed on the radially outer wall of each of certain of the convolutions of the spiral rib 8 on the plate 5 is a tooth 20 and formed on the radially inner wall of the adjacent outer convolution is a hump 21. The tooth 20 projects outwardly across the portion of the spiral groove 9 defined between the convolutions from which the tooth and hump respectively project and the corresponding hump 21 projects radially inwards across the same portion of the spiral groove.

Each tooth is of ratchet form, that is to say, it has a radial face and an inclined face, and the corresponding hump is positioned a short distance beyond the radial face of the tooth on the side thereof away from the entry end 24 of the spiral groove 9 as shown in Figure 3.

The plate 6 is also provided with teeth 22 and corresponding humps 23 as shown in Figure 6.

Although in the construction illustrated by way of example in the drawings the teeth and humps are provided on certain of the convolutions only of the spiral rib, a tooth may be provided on each convolution except the outermost, and a co-operating hump may be provided on each convolution except the innermost.

The positions of the groove 17 and rib 19 are so chosen that when the spool is assembled the bottoms of the spiral grooves 9 and 14 are spaced apart by a distance slightly greater than the width of the film to be accommodated between the plates 5 and 6 so that when the film is inserted in the spool with its edges held in the spiral grooves the edges of the film cannot touch the bottoms of both grooves at once.

In order to insert the film the plates 5 and 6 are rotated relatively to one another until the entrances 24, 25 to their respective spiral grooves are opposite to one another and the leading edge of the film is then inserted into the spiral grooves and is pushed into them until it has passed beyond the first tooth and hump of each plate.

One of the plates (for example plate 6) is then held stationary, while the other (plate 5) is rotated relatively thereto in the direction in which it is required to move the film in order to wind it into the spiral groove. (Counterclockwise for the plate 5 shown in Figure 3.)

Owing to the shape of the tooth 20 and its disposition with its radial face directed away from the entrance 24 to the spiral groove, the tooth 20 entrains the edge of the film during this rotation of the plate 5 and pulls the film further into the spiral groove on the other plate. The grip of the tooth on the film is increased by the hump 21 which bends the film about the top of the tooth.

After the plate 5 has thus been turned through say a quarter of a revolution, it is turned in the reverse direction and advanced again, this alternate advance and return being repeated until the whole of the film has become wound into the spiral grooves.

During this movement of the film the edge thereof which is engaged by the tooth 20 of the plate 5 during the advance movement slides freely over said tooth 20 during the return movement this action being permitted by the fact that the inclined face of the tooth 20 is facing the direction from which the film is travelling.

By thus alternately holding one plate stationary while rotating the other alternately in the direction of movement of the film and then in the reverse direction the film can be quickly and easily wound completely into the spiral grooves without damage or jamming. As the film becomes wound further and further into the spiral groove the remaining teeth take up the drive until when the film is almost completely wound all the teeth are in action together so that the film is engaged at several points along its spirally wound length.

Instead of holding one plate stationary while turning the other plate alternately backwards and forwards, the film can also be wound by oscillating the two plates in opposite directions relatively to one another.

By arranging the unidirectional film gripping means to cause the film to travel in the appropriate direction, the film can be loaded from the centre of the spool. In this case the central sleeves of the spool are made of sufficient internal diameter to accommodate the roll of film to be loaded in the ecntral space, from which the film passes through an opening or slit into the inner ends of the spiral grooves which are open to receive it.

After the spool has been thus loaded it is inserted in the tank 1 and in order to mount the spool for rotation in the tank the following construction is employed.

The bottom of the tank 1 has the central upwardly projecting hollow boss 4 provided with a transverse web 27 and the sleeve 7 of the plate 5 is provided with a web 28 from which project a number of fingers 29 each having a rounded end. These fingers 29 project into the recess 30 formed by the continuation of the bore of the sleeve 7 through the centre of the plate 5.

The loaded spool is inserted into the tank with the plate 5 lowermost and the recess 30 is engaged over the boss 4, the ends of the fingers 29 resting on the upper face of the web 27 to maintain the plate 5 spaced away from the bottom of the tank.

The lid 2 is then applied to the tank and the hollow stem 31 of an operating knob 32 is inserted through the inwardly directed boss 3 of the lid, and through a hole 34 in the plate 6 into the sleeve 7 of the plate 5, the boss 3 serving as a bearing for the upper end of the stem which is further supported by an annular rib 35 on the outside of the lid, said rib 35 engaging the inside of a depending skirt portion 36 of the knob 32.

The lower end 37 of the stem 31 is formed hexagonal to engage in the hexagonal recess 38 in the sleeve 7 whereby rotation of the knob 32 effects rotation of the spool.

The hollow knob and stem serve for the introduction of treating liquid into the tank.

Figures 8, 9, 10 and 11 illustrate alternative forms of unidirectional film-gripping means which may be employed. In Figure 8 the means consist of a spring-loaded pawl 39 secured to the ungrooved face of the plate, the engaging tooth of which projects through an opening in the plate into the spiral groove 9. In Figure 9 the means consist of a spring-loaded pawl 40 secured to the ungrooved face of the plate and having a serrated engaging edge projecting through an opening in the plate into the spiral groove 9. The adjacent rib 8 is formed with a hump 41 against which the serrated edge may abut. In Figure 10 the means consist of a cam 42 which may have a plain surface but which is illustrated with a roughed surface and mounted in the groove 9 as shown. In Figure 11 the means consist of a captive ball 43 running on an inclined plane 44 formed in the rib 8.

Spools constructed according to the invention may be used for winding both perforated and unperforated films. When films having marginal perforations are to be wound, I prefer to use teeth as described above arranged so as to engage in the perforations, whereby a positive drive is attained. With unperforated film, sharper teeth are employed and are preferably pivoted or spring urged or both so as to increase the grip of the teeth by compressing the film between the tooth and the opposite wall of the groove.

With perforated film or unperforated film I prefer to arrange the teeth symmetrically on the spiral grooved plates, that is to say, each tooth on one plate is the same distance from the entrance to the spiral groove as a corresponding tooth on the other plate. In addition, the firmness of the grip of each tooth is adjusted by increasing or decreasing the size of the hump adjacent to it so that alternate corresponding teeth on each plate grip the film firmly, and intermediate teeth grip lightly, allowing slipping of the film.

Referring to the drawings by way of example, the plate 5 (Figure 3) is shown with four teeth 20 arranged symmetrically with four corresponding teeth 22 on the plate 6 (Figure 6). The grip of each tooth is adjusted so that if the first and third teeth on the plate 5 counting from the entrance to the spiral groove grip the film firmly, the second and fourth teeth on the plate 6 grip firmly, and the other teeth grip lightly.

I claim:

1. A spool adapted to hold a length of photographic film in spaced spiral form, which comprises a first plate having a clockwise spiral groove on one face thereof, a second plate having a similar but anticlockwise groove on one face thereof, means for holding the said plates in coaxial spaced relationship with the spirally-grooved faces directed inwards and together defining a single spiral path, said means permitting relative rotation of the said plates, at least one of said grooves having a plurality of ratchet teeth therein, said teeth being spaced apart from one another, at least one such tooth having one face in a plane substantially radial to the axis of the plates and a second face in a plane inclined at an angle thereto.

2. A spool adapted to hold a length of photographic film in spaced spiral form, which comprises a first plate having a clockwise spiral groove on one face thereof, a second plate having a similar but anticlockwise groove on one face thereof, means for holding the said plates in coaxial spaced relationship with the spirally-grooved faces directed inwards and together defining a single spiral path, said means permitting relative rotation of the said plates, at least one of said grooves having a plurality of ratchet teeth therein, said teeth being secured to the inner wall of the groove and spaced apart from one another, at least one such tooth having one face in a plane substantially radial to the axis of the plates and a second face in a plane inclined at an angle thereto.

3. A spool adapted to hold a length of photographic film in spaced spiral form, which comprises a first plate having a clockwise spiral groove on one face thereof, a second plate having a similar but anticlockwise groove on one face thereof, means for holding the said plates in coaxial spaced relationship with the spirally-grooved faces directed inwards and together defining a single spiral path, said means permitting relative rotation of the said plates, at least one of said grooves having a plurality of ratchet teeth therein, said teeth being secured to the inner wall of the groove and spaced apart from one another, at least one such tooth having one face in a plane substantially radial to the axis of the plates and a second face in a plane inclined at an angle thereto, and a projection associated with at least one such tooth extending from the outer wall of the groove partially across said groove at a point near said tooth and on the side thereof nearer to the radial face.

4. A spool adapted to hold a length of photographic film in spaced spiral form, which comprises a first plate having a clockwise spiral groove on one face thereof, a second plate having a similar but anticlockwise groove on one face thereof, means for holding the said plates in coaxial spaced relationship with the spirally-grooved faces directed inwards and together defining a single spiral path, said means permitting relative rotation of the said plates, at least one of said grooves having a plurality of ratchet teeth therein, said teeth being spaced apart from one another, at least one such tooth having one face in a plane substantially radial to the axis of the plates and a second face in a plane inclined at an angle thereto, and a projection associated with at least one such tooth extending partially across the groove at a point near said tooth and on the side thereof nearer to the radial face.

5. A spool adapted to hold a length of photographic film in spaced spiral form which comprises a first plate having a clockwise spiral groove on one face thereof and a part hub centrally disposed on the said face, a second plate having a similar but anticlockwise spiral groove on one face thereof and a part hub centrally disposed on the said face, connecting means for the said part hubs whereby the part hubs together form the central hub of a spool construction of which the said plates form the flanges, the spiral grooves facing inwardly of the said spool construction and together defining a single spiral path and the said connecting means permitting relative rotation of the said plates on the hub axis, at least one of said grooves having a plurality of ratchet teeth therein, said teeth being secured to the inner wall of the groove and spaced apart from one another, at least one such tooth having one face in a plane substantially radial to the hub axis and a second face in a plane inclined at an angle thereto, and a projection associated with at least one such tooth extending from the outer wall of the groove partially across the groove at a point near the said tooth and on the side thereof nearer to the said radial face.

6. A spool adapted to hold a length of photographic film in spaced spiral form which comprises a first plate having a clockwise spiral groove on one face thereof and a part hub centrally disposed on the said face, a second plate having a similar but anticlockwise spiral groove on one face thereof and a part hub centrally disposed on the said face, connecting means for the said part hubs whereby the part hubs together form the central hub of a spool construction of which the said plates form the flanges, the spiral grooves facing inwardly of the said spool construction and together defining a single spiral path and the said connecting means permitting relative rotation of the said plates on the hub axis, at least one of said grooves having a plurality of ratchet teeth therein, said teeth being spaced apart from one another, at least one such tooth being provided with a spring urging it to extend across the groove, at least one such tooth having one face in a plane substantially radial to the hub axis and a second face in a plane inclined at an angle thereto, and a projection associated with at least one such tooth extending partially across the groove at a point near the said tooth and on the side thereof nearer to the said radial face.

7. A spool adapted to hold a length of photographic film in spaced spiral form which comprises a first plate having a clockwise spiral groove on one face thereof and a part hub centrally disposed on the said face, a second plate having a similar but anticlockwise spiral groove on one face thereof and a part hub centrally disposed on the said face, connecting means for the said part hubs whereby the part hubs together form the central hub of a spool construction of which the said plates form the flanges, the spiral grooves facing inwardly of the said spool construction and together defining a single spiral path and the said connecting means permitting relative rotation of the said plates on the hub axis, and being adjustable to vary the distance between the said plates when so connected, at least one of said grooves having a plurality of ratchet teeth therein, said teeth being secured to the inner wall of the groove and spaced apart from one another, at least one such tooth having one face in a plane substantially radial to the hub axis and a second face in a plane inclined at an angle thereto and a projection associated with at least one such tooth extending from the outer wall of the groove partially across the groove at a point near the said tooth and on the side thereof nearer to the said radial face.

8. A spool adapted to hold a length of photographic film in spaced spiral form, which comprises a first plate having a clockwise spiral groove on one face thereof, a second plate having a similar but anticlockwise groove on one face thereof, means for holding the said plates in coaxial spaced relationship with the spirally-grooved faces directed inwards and together defining a single spiral path, said means permitting relative rotation of the said plates, at least one ratchet tooth located in at least one of said grooves, at least one such tooth having one face in a plane substantially radial to the axis of the plates and a second face in a plane inclined at an angle thereto.

9. A spool adapted to hold a length of photographic film in spaced spiral form, which comprises a first plate having a clockwise spiral groove on one face thereof, a second plate having a similar but anticlockwise groove on one face thereof, means for holding the said plate in coaxial spaced relationship with the spirally-grooved faces directed inwards and together defining a single spiral path, said means permitting relative rotation of the said plates, a single ratchet tooth in at least one of the said grooves, said tooth having one face in a plane substantially radial to the axis of the plates and a second face in a plane inclined at an angle thereto.

DONALD MacDOUGAL PATERSON.

REFERENCES CITED

The following references are of record in the file of this patent:

UNITED STATES PATENTS

| Number | Name | Date |
|---|---|---|
| 2,218,392 | Chafvin | Oct. 15, 1940 |
| 2,290,152 | Andrews et al. | July 21, 1942 |
| 2,334,952 | Perbal | Nov. 23, 1943 |

FOREIGN PATENTS

| Number | Country | Date |
|---|---|---|
| 597,894 | Great Britain | Feb. 5, 1948 |
| 657,012 | Germany | Feb. 23, 1938 |